(12) United States Patent  
Boppana (10) Patent No.: US 9,128,791 B1  
(45) Date of Patent: Sep. 8, 2015

(54) GENERATION OF DISTINCT PSEUDORANDOM NUMBER STREAMS BASED ON PROGRAM CONTEXT

(75) Inventor: Rajendra V. Boppana, San Antonio, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 355 days.

(21) Appl. No.: 13/426,028

(22) Filed: Mar. 21, 2012

Related U.S. Application Data

(60) Provisional application No. 61/454,856, filed on Mar. 21, 2011.

(51) Int. Cl.  
    *G06F 7/58* (2006.01)
(52) U.S. Cl.  
    CPC ........................................ *G06F 7/58* (2013.01)

(58) Field of Classification Search  
    None  
    See application file for complete search history.

(56) References Cited

U.S. PATENT DOCUMENTS

| | | | | |
|---|---|---|---|---|
| 5,446,683 | A | * | 8/1995 | Mullen et al. .................. 708/256 |
| 2010/0070549 | A1 | * | 3/2010 | Nagaraj ........................ 708/254 |

* cited by examiner

*Primary Examiner* — Michael D Yaary  
(74) *Attorney, Agent, or Firm* — Meyertons, Hood, Kivlin, Kowert & Goetzel, P.C.; Eric B. Meyertons (57) ABSTRACT

A method of providing random number streams to a process includes determining two or more program contexts within a process. Each of the program contexts may include code that calls for one or more random numbers. For each of at least two of the program contexts, a random number stream is provided to the process. The random number stream for each program context is based on the determined program context and is distinct from the random number stream for the other program contexts in the process.

18 Claims, 3 Drawing Sheets

GENERATION OF DISTINCT PSEUDORANDOM NUMBER STREAMS BASED ON PROGRAM CONTEXT

PRIORITY CLAIM

This application claims priority to U.S. Provisional Application No. 61/454,856 entitled "GENERATION OF DISTINCT PSEUDORANDOM NUMBER STREAMS BASED ON PROGRAM CONTEXT" to Boppana filed Mar. 21, 2011, which is incorporated herein by reference in its entirety.

BACKGROUND

1. Field

This disclosure is generally related to parallel computing applications, simulation codes and protocols that use pseudorandom numbers and more specifically to algorithms and methods to generate pseudorandom numbers.

2. Description of the Related Art

Many important scientific computing applications, business and finance applications, and complex systems modeling and analysis techniques use pseudorandom number generators ("RNGs"). These applications may take advantage of the availability of thousands of computing cores on heterogeneous systems comprising multi-core processors ("CPUs") and highly parallel general purpose graphics processing units ("GPUs"), provided that suitable parallel pseudorandom number generators ("PRNGs") are available to simultaneously feed thousands of computing streams with high quality random number ("RN") streams with low intra- and inter-stream correlations (inter-stream correlations may be referred to herein as "ISCs").

A parallel or distributed application has the computational task that may be divided into several thousands or millions of subtasks, with each subtask executed by a separate thread or process (henceforth, process). Each process has distinct ID that is usually logically numbered within the context of the application execution.

For an iterative parallel application, each process may execute some of the iterations. For example, for a large lattice structure simulation, each process may simulate the working of a few of the lattice points. Therefore, processes often cycle through computing and communication mode. In the computing mode, a process may use the available data to perform new calculations needed to make progress toward the solution. In the communication mode, a process may send its data or receive other process' data.

It is common to use the single-program multiple data (SPMD) programming method to code parallel applications, in which each of the processes receives the same computer code but has explicit instructions that specify based on the process's ID its portion of the task.

If an SPMD-based parallel application code that uses random numbers is executed, all or some of the processes (spawned for the execution of the application code) request random numbers from the same program locations or contexts.

In some applications, all required processes may be spawned statically at the start of the code execution. In other applications, some of the processes are spawned initially and any additional processes are spawned dynamically by the existing processes based on the application data and the coded algorithm or model. In highly complex simulation codes, the initial processes may need to spawn additional processes, dynamically, during the execution. However, with SPMD programming method, all processes use the same application code with the task for each process specified by conditional statements based on the data and the process ID.

In some systems, to distinguish requests for random numbers from different processes, an application is coded such that each process uses a RN stream identifier to explicitly identify a distinct stream allocated to it. The stream allocated to a process may be initialized by a special function call prior to generating or using any RNs from that stream.

A large application code that uses RNs may be executed by dividing the computing task among multiple processes. Typically, each process is allocated at least one distinct RN stream to provide the RNs needed during its computations. To improve randomness and to improve the reproducibility of results, an application may be coded such that each portion of computing workload, for example, each small subset of the iterations of a large iterative code, may be assigned a distinct RN stream identifier so that each workload may use a distinct RN stream for the necessary RNs in its execution. In such cases, especially for efficiency reasons, each process may be assigned one or more of the computing workloads, and thus, one or more of the distinct RN stream identifiers. It is computationally inefficient, hard to reproduce results, or both to code an application so that an RN stream is shared by multiple processes.

The RN streams to processes may be allocated based on the input data and/or computations allocated to them. For example, if a computational loop is partitioned cyclically among p processes, then iteration i may be executed by process i % p; if each iteration is to use a separate RN stream, then the number of iterations is smaller than the maximum of RN streams and it may be natural to allocate RN streams i, i+p, . . . from the set of all RN streams to process i.

One way to ensure that distinct RN streams are used is to allocate distinct RN stream identifiers and to use a PRNG that ensures that distinct RN stream identifiers result in initialization of distinct RN streams, which for a well-designed PRNG, may have low or undetectable—based on the currently available statistical and other tests—interstream correlations.

If the application requires each process or computational workload to request random numbers from multiple program locations or contexts, then there may be two options. One option is to use the same RN stream for all contexts within a process. The same contexts in two different processes will still use distinct RN streams provided distinct stream identifiers are allocated and initialized for different processes.

A second option is to use multiple distinct streams for multiple contexts in each process, potentially one distinct RN stream for each distinct program context. This second option may be desirable for better randomness properties. In such a case, the application code is explicitly written to manage these multiple streams. If the number of distinct streams needed for an application is not known in advance, the maximum number of streams needed per process is estimated and the same are allocated to each process.

If the estimation is too small, then a program error is generated and execution is halted. In this case, the user needs to revise the estimate for the number of streams needed and resubmit the application for execution.

If the estimation is too large, then the program may run out of distinct RN streams for processes spawned after some point. This is especially true for parallel applications that are tuned and run on large clusters of computers with a large number of processes are run on even larger clusters of computers with even more processes, by a simple change in compile-time or runtime options without application recoding, to take advantage of the additional performance offered by the larger hardware.

To further control the generation of RN streams, an application may provide a single-seed value, typically by a designated master process (usually process 0) to a PRNG. The single-seed value is typically a 32- or 64-bit number, often an integer, specified by the user as part of the application's input data. By keeping all other input data the same and changing only the seed value, the user can run multiple instances of the same scenario, average the results and obtain potential simulation error estimations (also called, confidence intervals in statistics).

The quality of the random numbers used may be crucial for quick and accurate solutions to simulation-based computer solutions and for robust security protocols and security keys used in security protocols. It may be desirable to use distinct parallel RN streams if an application code calls for RNs from multiple distinct locations so that, within a process, multiple calls for RNs from the same location (also called, program context) are satisfied by providing RNs from a specific stream, while the calls for RNs from different locations of the program within the same computing iteration will be satisfied by providing RNs from different streams. Distinct RN streams across different processes may be ensured by the use of distinct RN stream identifiers to initialize the RN streams. To use distinct RN streams for distinct contexts within a process or computational workload, the application has to be coded specifically to use distinct RN stream identifiers for each such program context. Such an approach may, however, provide an unreasonable burden on the application designer and make revisions to application code, which may change the number of program contexts from which RNs are requested, cumbersome and potentially error-prone.

In some parameterized PRNGs, each process is given one RN stream with appropriately parameterized seed or iteration function. Two main approaches to design PRNGs are (a) splitting a sequential RN stream into multiple substreams, with each substream treated as a distinct RN stream for application execution purposes, and (b) parameterization of the initialization (seed) state of an RNG with multiple random number cycles or the parameterization of the iteration function of the initialization of an RNG. The leap-frog technique which splits a sequential RN stream in an interleaved manner—if a sequential stream consisting of $x_1, x_2, x_3, \ldots$ needs to be split into k streams, then stream i consists of RNs $x_i, x_{k+i}, x_{2k+i}, \ldots$, $1 \leq i \leq k$—received extensive attention. But it is inherently not scalable owing to initialization cost—a large multiple of k RNs must be generated first to initialize each processor/process—and potentially increased intra-stream correlations.

The Mersenne twister (MT) is a variant of feedback shift register-based random number generator. The original generator MT19937, which generates a single RN stream with a very long cycle of length $2^{19937}$ (that is, the sequence of RNs repeats after generating this many RNs), is very popular and is widely implemented in various software packages (including Gnu Scientific Library, gsl package). SFMT19937, a parallel 128-bit version, and MTGP, a GPU version as part of NVIDIA CUDA library, are also available. Using MT to generate multiple parallel RN streams often requires splitting its sequential RN stream. This is largely an ad hoc process since the maximum number of RNs needed in each segment needs to be estimated. This also may compromise the randomness quality since segmenting the stream and using the segments changes the correlations among the RNs used. Direct parallelization by changing the parameters of MT is computationally expensive and may not be suitable for dynamic generation of random number streams in a high-performance simulation code.

SUMMARY

In an embodiment, a method of providing random number streams to a process includes determining one or more program contexts within a process. Each of the program contexts may include code that calls for one or more random numbers. For each of at least two of the program contexts, a random number stream is provided to the process. The random number stream for each program context is based on the determined program context and is distinct from the random number stream for the other program contexts in the process.

In an embodiment, a method of providing random numbers streams to processes performing a parallel computation includes determining program contexts within one process of a parallel computation. Each of the program contexts may include code that calls for one or more random numbers. A random number stream is provided to the process for each of the program contexts. The random number stream provided is based in part on the determined program context and based in part on which of the two or more processes the program context is in.

In an embodiment, a method of providing random numbers streams to processes performing a parallel computation includes receiving a call for one or more random numbers from a program context in a process of a parallel computation. A random number stream is used to provide a random number for each such call. The random number stream provided is based at least in part on the determined program context.

In some embodiments, a context-aware parallel pseudorandom number generator uses the program context in which a request for a random number is made to automatically select and use distinct random number streams for distinct contexts.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As used herein, "random number" includes a pseudorandom number. As used herein, a "random number generator" includes a pseudorandom number generator.

As used herein, a "context-aware parallel pseudorandom number generator" means a parallel pseudorandom number generator which generates one or more random number streams and provides random numbers based on information relating to a program context for requesting random numbers.

As used herein, the phrase "primitive process", or simply "process", is used to represent a thread or process assigned to execute one computational workload. In some cases, a thread or process used in an execution of the application may perform the work of multiple primitive processes.

In some embodiments, distinct random number streams are assigned to different program contexts. The streams may be assigned such that no two processes cooperatively working on a parallel computation use the same random number stream. In some embodiments, the use of program context enables context-aware parallel pseudorandom number generators to generate distinct random number streams even for processes that use only one stream identifier by call for random numbers from multiple locations.

In some embodiments, a collection of random number streams is given to each process so that each distinct statement (denoted, random number context) that calls for a random number is served with a distinct generator taken from the PRNGs assigned to that process. To ensure that each process of the parallel computation that executes the same code uses distinct random number streams, the streams may, in certain embodiments, be further initialized with distinct RN stream identifiers supplied by the application code. This RN stream identifier may be used to determine a distinct identifier, in 64- or more bits, generated by a special library module.

In some embodiments, random number context (RN-context) is used in conjunction with the RN stream identifier to determine the RN stream to be used. The RN context may be derived from the return address of the function call to the random number generator.

Figure 1:
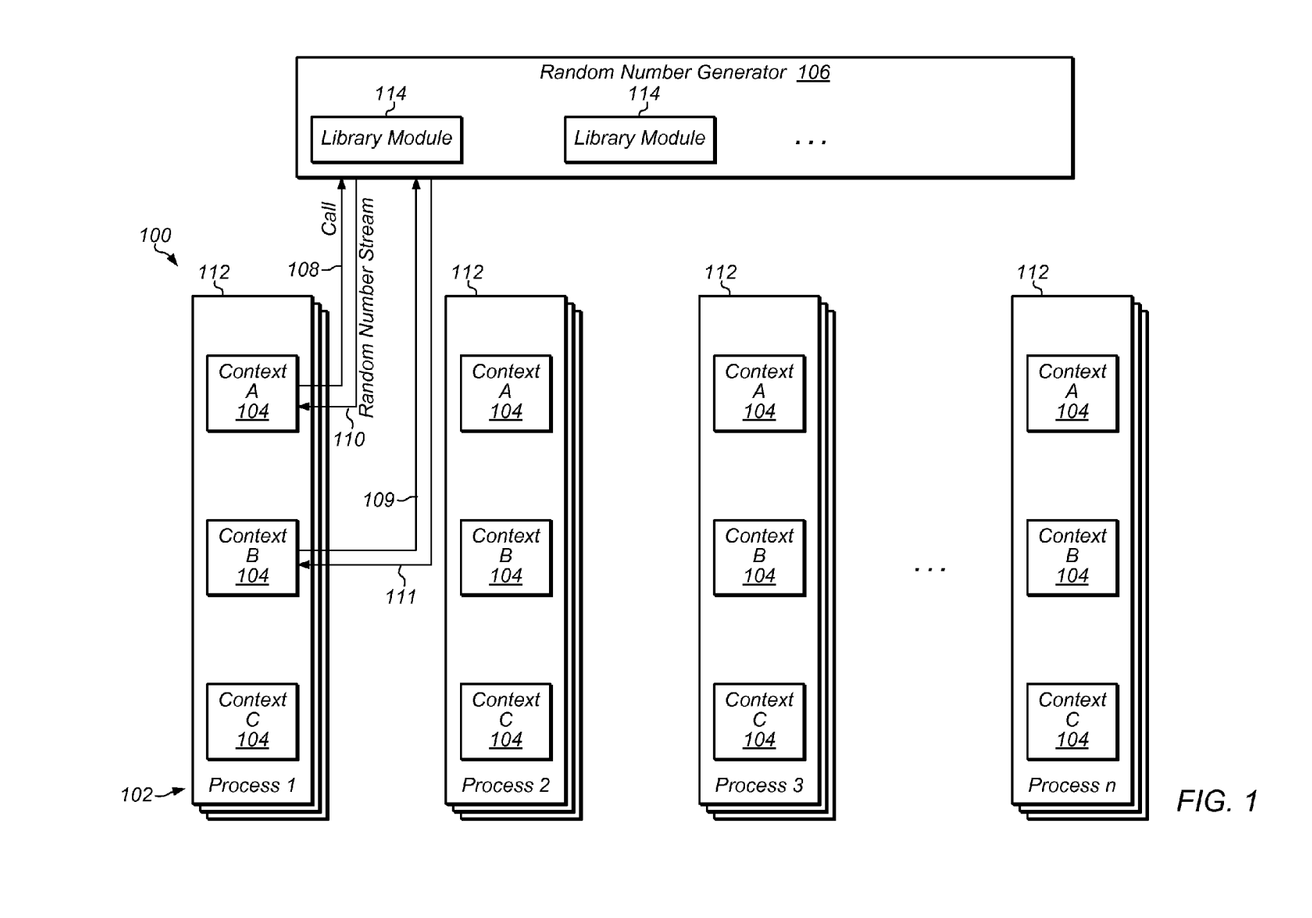
FIG. 1 is a block diagram illustrating a random number generator that provides distinct random number streams to different program contexts of a parallel computation.

FIG. 1 is a block diagram illustrating a random number generator that provides distinct random number streams to different program contexts of a parallel computation. Parallel computation 100 includes processes 102. In some embodiments, processes 102 each include SPMD-based parallel application code for carrying out parallel computation 100. Contexts 104 may correspond to a location in the code of one of processes 102. Processes 102 include contexts 104.

Random number generator 106 may provide random number streams to contexts 104 in processes 102. Each of contexts 104 may make calls 108 requesting random numbers. In response, random number generator 106 may generate a random number stream 110 to the context. In some embodiments, each random number stream 110 is generated from, or retrieved from, one of library modules 114.

In some embodiments, a distinct stream is provided to each random number context. For example, the random number stream provided to context A of process 1 may be distinct from the random number streams provided to context B of process 1, which may be different from the random number stream provided to context C of process 1, and so on.

Each of processes 102 may include multiple iterations 112. Each of iterations 112 may be associated with an iteration number. For each of iterations 112 of processes 102, context 104 may separately call for a random number stream.

In some embodiments, random number context (RN-context) is used with other information to determine an RN stream to be used for a computation. The RN context may be derived from the return address of the function call to the random number generator, a process number or thread number, an iteration number (if appropriate), any user supplied stream identifier, or a combination of one or more of these elements. A user supplied stream identifier may be, for example, an index to RN stream contexts or a pointer to a data structure containing the RN stream context.

Figure 2:
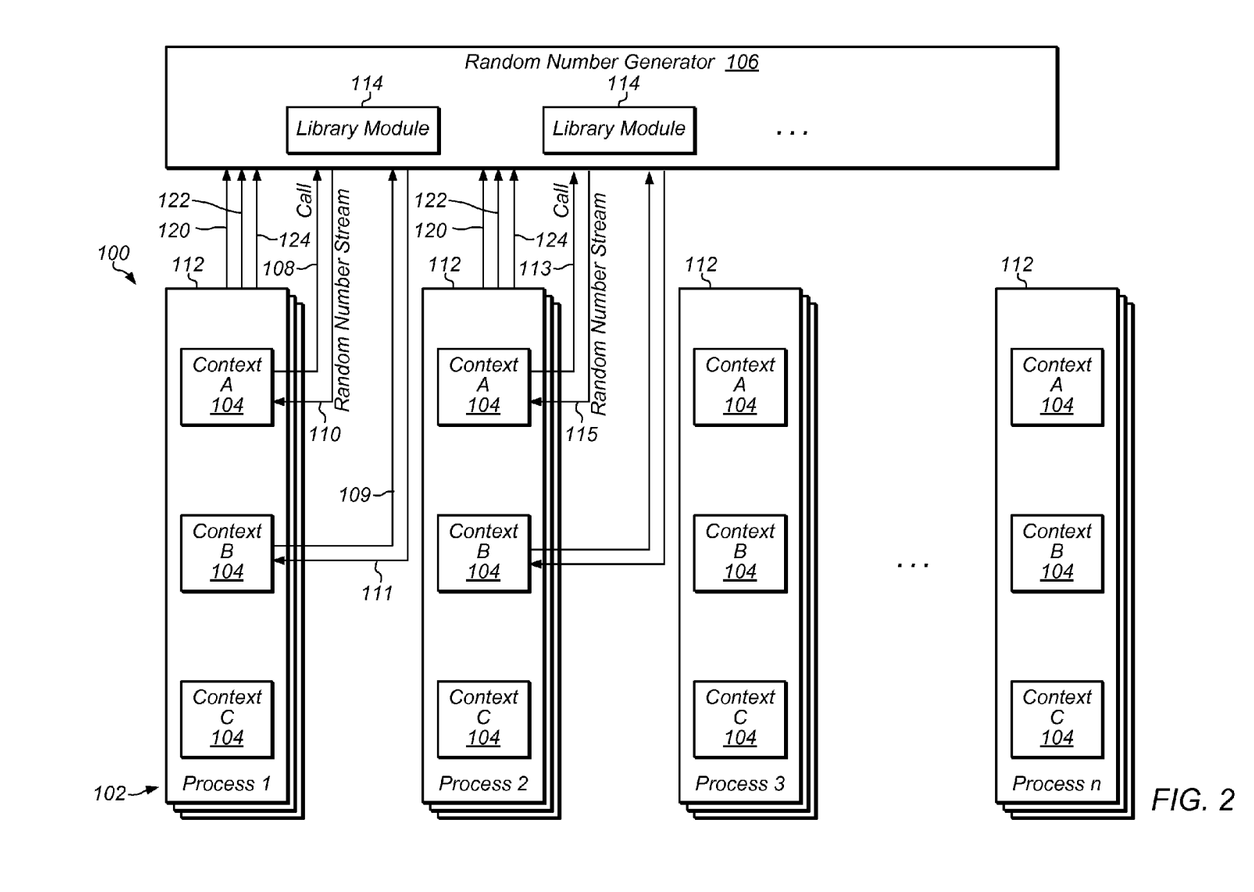
FIG. 2 is a block diagram illustrating a random number generator that can provide distinct random number streams to different program contexts and different processes of a parallel computation based on program context and other information.

FIG. 2 is a block diagram illustrating a random number generator that can provide distinct random number streams to different program contexts and different processes of a parallel computation based on program context and other information. An application's request for a random number may provide user-specified stream ID 120 to library module 114. A process ID 122 may be associated with each of processes 102. An iteration number 124 may be associated with each iteration of a process. User-specified stream ID 120, process ID 122, and iteration number 124 may be accessed by random number generator 106. In some embodiments, random number generator 106 uses one or more of user-specified stream ID 120, process ID 122, and iteration number 124, in combination context information associated with one of contexts 104, to determine the random number stream to be used to provide one or more random numbers to the context. The random number stream may be initialized if it is not already initialized, as in the case of the first call to this stream.

Each of processes 102 may have unique process ID 122. Random number generator 106 may provide a distinct stream to each program context and process. Thus, for example, random number stream 115 supplied to Context A of process 2 in response to call 113 may be distinct from random number stream 110 supplied to Context A of process 1 in response to call 108.

In one embodiment, context-aware parallel pseudorandom number generators are implemented as library modules that can be linked to application codes at the compile time. Random numbers may be retrieved from the CPRNG library using function calls at the run time.

Figure 3:
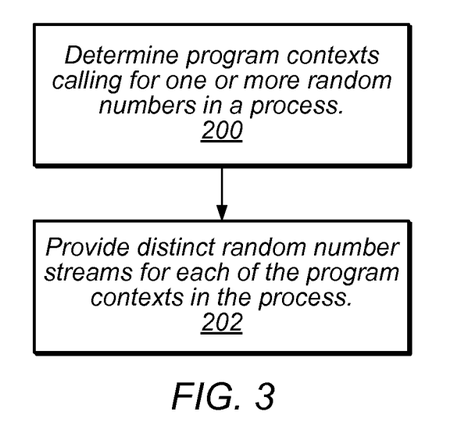
FIG. 3 illustrates providing random number streams to a process based on a determined program context.

FIG. 3 illustrates providing random number streams to a process based on a determined program context. At 200, a program context is determined for program contexts within a process. Each of the program contexts may include code that calls for one or more random numbers. For example, referring to FIG. 1, process 1 includes program context A, Context B, and Context C.

At 202, a random number stream is provided for each of the program contexts based on the determined program context. For example, referring to FIG. 1, random number generator 106 may provide a distinct random number stream to each of Context A, Context B, and Context C in process 1. For example, random number stream 111 provided to Context B in response to call 109 may be distinct from random number stream 110 provided to Context A in response to call 108.

In some embodiments, random number streams are generated for two or more processes in a parallel computation. The random numbers streams may be provided such that the random number streams used by one process are distinct from those of other processes. In certain embodiments, streams are generated such that the corresponding contexts of different parallel processes are provided with distinct random number streams. For example, random number generator 106 may provide a random number stream to context A of process 1 that is distinct from the random number stream provided to context A of process 2.

In some embodiments, a parameterized pseudorandom number generator (RNG) is used to generate a large number of random number (RN) streams. The RNG may be augmented with a scalable and automatic initialization process. Parameterized PRNGs that may be used in some embodiments of a context-aware random number generator include an additive lagged Fibonacci generator (ALFG) or a multiplicative lagged Fibonacci generator (MLFG).

An additive lagged Fibonacci generator (ALFG) uses an addition-based recursion:

$$x_n = x_{n-k} + x_{n-l} \pmod{2^m}, \ 0 < k < l < n,$$

where l and k are the lags (or indices to the older numbers used to generate the new number), n,l,k are positive integers, and $x_i$'s are m-bit random numbers. The values l=17 and k=5 are commonly used to generate multiple distinct streams of 32- or 64-bit RNs. However, to pass very stringent intra-stream correlations tests, the lag, l, needs to be very high, over 1000.

A drawback of ALFG may be the initialization cost of l words before generating any RNs that can be used by the application code.

An advantage of ALFG may be that it has a large number of independent and long cycles of RNs. For a b-bit, r lagged ALFG, there are $2^{(b-1)(l-1)}$ cycles, each of length $(2^l-1)2^{b-1}$.

A multiplicative lagged Fibonacci generator (MLFG) is similar to ALFG except that multiplication instead of addition is used in the recursion. MLFG has only one-fourth as many cycles, and each of only one-fourth as long as those in ALFG. MLFGs may be suitable in many embodiments of a CPRNG, since even with a small lag of 17, it may be feasible to generate RN streams that pass many of the stringent tests.

The multiplicative Fibonacci lagged generator (MLFG) uses the recurrence relation $$x_n = x_{n-k} \times x_{n-l} \pmod{2^m}, \ 0 < k < l < n,$$

Where m is the random integer size in bits, l and k are the lags or offsets to the stream of previously generated random numbers, and $x_i$, i>l, are the random numbers generated. RNs $x_2, \ldots, x_l$ form the initialization (seed) sequence or state and the initial words of a RN stream. The state of RN stream is always given by its most recent l words. Theoretical results show that each distinct combination of certain (l−3)×(m−1) of the l×m bits in the seed gives a distinct RN stream for a total of $2^{(l-3)(m-1)}$ streams, each with a cycle of $2^{(l-3)\times(2^m-1)} \approx 2^{m+l-1}$ RNs. Therefore, there are (m−3)×(l−1) bits that may need to be determined uniquely for each RN stream initialization (seed) sequence.

A 64-bit MFLG with lag 17 may be implemented in one example. With 64-bit integers and a lag of 17, there are $2^{61 \times 16} = 2^{976} \approx 6 \times 10^{293}$ different RN streams, each with distinct 976-bit seed value and a cycle length of $2^{61} \cdot (2^{17}-1) \approx 2^{78} \approx 3 \times 10^{23}$. A few of the lower bits of $x_i$'s may be discarded and remaining bits of $x_1$'s are used to supply the RNs to improve the randomness since the lower bits are often less random owing to the arithmetic operation involved. The random numbers may be provided as integers or as real numbers in the range [0,1) by computing the fractions resulting from the division of the integer $x_i$'s with 1+max_rn, where max_rn is the maximum value an $x_1$ may take. In one embodiment, a PRNG package called SPRNG and the MLFG available from its library are used to implement a CPRNG.

In one implementation of context-aware random number generation, a SPRNG library package provides init_rng() and get_rn_dbl() function calls to initialize a new RN stream and to obtain the next RN in an already initialized stream, respectively. The init_rng function is called by specifying the seed, parameters set that specify the lags and the locations of the odd numbered words in the initial set of lag words, maximum number of RN streams (denoted max_str) that will be requested by the application, and cur_str, the RN stream number in the range 0, 1, . . . , max_str−1 that needs to be initialized. The seed, parameter set, and max_str may be common in all init_rng() calls. Each call to init_rng function returns a pointer to one RN stream.

In one embodiment of a CPRNG implementation, each init_rng() call allocates not just one RN stream but a set of distinct RN streams and returns a pointer, str_ptr, to the set; the streams in this set can be customized with program context without further calls to init_rng() The RN-context, the context or the program location from which a RN number is requested, is used in addition to the stream-set pointer, str_ptr, to determine the specific RN stream to be used. The RN context may be derived from a combination of the program line number in the source code, the return address of the function call to get_rn_dbl() the process/thread numbers, and any user supplied identifiers such as the iteration number. When the application requests for a random number using the function call get_rn_dbl(str_ptr), the RN-context is used to determine the specific RN stream to be used in the set of streams pointed by str_ptr. The appropriate RN stream may be automatically initialized with the RN-context, if it is the first call from this context, and a RN from the stream is returned.

Each call to init_rng() may result in the initialization of the RN stream specified by the stream number, cur_str, and the calling code is given a pointer to the RN stream that should be used as argument in the function call get_rn_dbl() to obtain the next RN in the stream.

In this example embodiment, CPRNG differs from the MLFG in the SPRNG package in several ways: (a) automatically generating distinct RN streams based on program context for the same str_ptr value; (b) initialization method used to seed RN streams to improve the randomness and also to ensure that RN context can be added to dynamically create distinct RN streams without requiring additional init_rng() calls; (c) the distinct ID field that allocates distinct values for a portion of the seed sequence statically (when the cur_str value is less than max_str value in the function call init_rng() and additional seed sequences dynamically beyond the max_str limit in case the application requires more RN streams than originally estimated. Extensive statistical tests are used to show that CPRNG implementation of MLFG generates billions of RN streams with low interstream correlations while the implementation of the same theoretical generator in SPRNG exhibits statistically significant correlations for more than a million streams. The specification of max_str limits the maximum number of cur_str values that can be used to call init_rng() in SPRNG implementation, whereas max_str is a threshold to determine whether the initialization sequences are allocated statically or dynamically. Static allocation of the seed sequences improves repeatability of the computations when rerun with the same input data and dynamic allocation of seed sequences relieves the burden of specifying the maximum number of stream allocations needed a priori. Context-awareness provides distinct RN streams for distinct program contexts even when str_ptr used in the calls to get_rn_dbl() is the same. In SPRNG implementation, the application needs to be coded explicitly to use different str_ptr in calling get_rn_dbl() to achieve the same functionality. In this example embodiment, CPRNG may avoid such application coding and automate the management of distinct streams for distinct contexts.

Figure 4:
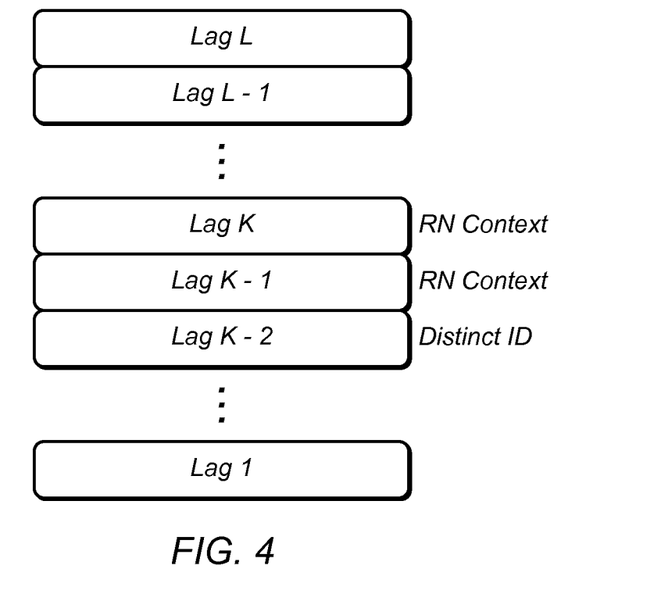
FIG. 4 illustrates one embodiment of the initialization process by a context-aware random number generator.

FIG. 4 illustrates one embodiment of the initialization process by CPRNG. In this example shown in FIG. 4, the initialization may be based on lag parameters l and k, 0<k<l−1. A call to init_rng( ) results initialization of l−3 of the lag words using a sequential RNG such as the recursion with carry (RWC) generator, a 32-bit generator, initialized with the user specified seed integer. In this example, these lag words are common to the initialization of all RN streams regardless of the process number or RN-context. One of the remaining three lag words is filled with an ID that is guaranteed to be distinct for distinct cur_str numbers specified in init_rng( ) The distinct ID word is common to the set of RN streams that are allocated based on different RN contexts but have the same cur_str number. The remaining two lag words are filled with the RN-context so that distinct RN-contexts result in distinct RN streams.

In the embodiment shown in FIG. 4, initialization of RN stream state by CPRNG. In this example, the state consists of l lag words. Each lag word is a 32-bit or, more typically, 64-bit word with maximum lag l, 1−3 of the lag words is filled randomly based on the user specified seed and a sequential RNG. In this example, these words are common to all RN streams used during the execution of the application. Lag k, k<l−1, is initialized with a unique and distinct ID that is associated with the cur_str used in the init_rng( ) call. Lags k+1 and k+2 are initialized with RN-context to create a distinct RN stream for each distinct program context in each process.

For MLFG, all the lag words are odd values. Therefore, for each lag word, only (m−3) of each lag word in an m-bit MLFG are determined uniquely, and a least significant bit determined by the canonical form and parameter set is appended to it to form an (m−2)-bit number, say, z. The actual lag word may be formed by using the operation $(-1)^y 3^z$ mod $2^m$, where y is a randomly generated 1 or 0. Henceforth, the discussion of a lag word initialization pertains to the generation of the (m−3) bits since every initial lag word will be transformed using the operation $(-1)^y 3^z$ mod $2^m$. For a 64-bit MLFG, two consecutive 32-bit RNs generated by the RWC generator may be used form a 61-bit integer for the lag words filled by it. Similarly, only 61 bits of each of the lag words used for distinct ID word and the RN context words need to be determined uniquely.

In some embodiments, the number of bits used for distinct ID may be more or fewer than m−3 bits, and more than one lag word or only a portion of a lag word may be used. Up to l−2 lag words are available for distinct ID specification. Similarly, the number of bits used RN context may be more or fewer than 2(m−3) bits used in the example embodiment in FIG. 4. Furthermore, the positions of distinct ID bits and RN context bits can be anywhere in the (m−3)×(l−1) bits available to seed distinct RN streams. Any bits not used for distinct ID and RN context fields will be randomly filled with the RWC or some other good sequential random number generator initialized with user supplied 32-bit or 64-bit single-seed value For a CPRNG based on MLFG with maximum lag l=17 and 64-bit words, $2^{2 \times 61} = 2^{122}$ distinct RN streams may be allocated with each init_rng( ) call. Based on the context and str_ptr argument used in a call to get_rn_dbl( ) an appropriate stream is selected, automatically initialized prior to first use, and the next RN in the stream is returned. CPRNG may be used without RN-contexts by choosing appropriate parameters to init_rng( ) call. If RN-contexts are not used, then the two lag words that are normally filled with RN-context are filled with the random bits generated by the sequential RWC generator. The lag word with distinct ID may be used to ensure that RN streams are distinct for distinct values of cur_str specified in the init_rng( ) CPRNG may be simply a basic MLFG when used without context.

For applications that use a large and variable number of RN streams, having to specify the maximum number of streams used during an execution run is a limitation. Furthermore, certain large-scale parallel applications may spawn additional processes and threads dynamically depending on the input data and intermediate results. To accommodate such situations, CPRNG may assign several ($2^{10}$ in the example embodiment) consecutive distinct IDs for the lag word k upon a call to init_rng( ) independent of any streams allocated to handle RN contexts. Therefore, CPRNG may allocate multiple initialization (seed) sequences, which can be used to initialize distinct RN streams by simply initializing the distinct ID lag word based on the unused distinct IDs allocated and keeping the other initialization words the same, to the calling process. Typically, only one of these IDs is used by a process. However, if a process spawns threads or child processes and needs to use additional distinct RN streams without going through the initialization process, it can have them without any communication overhead by using the original initialization with the distinct ID word replaced with one of the unused IDs from its allocated IDs. This leads to faster initialization of the new RN streams on demand. If more RN streams are needed and init_rng( ) is called with cur_str value greater than max_str, a monotonically increasing counter is used to ensure that the lag word K is distinct. However, the access to this counter may need to be serialized by using appropriate mutex locks in threaded applications or by assigning it to a process to serve the counter values to the other processes of the application. In these instances, an additional communication or serialization overhead may be incurred by CPRNG compared to the static methods used in some packages. On the other hand, CPRNG provides virtually unlimited number of RN streams on demand, limited only by the number of bits used for the distinct ID, and avoids depletion of the available RN streams that can occur with static partitioning of the available RN streams for applications with many levels of dynamic process/thread creation.

In some existing parallel random number generators (PRNG), only the user supplied stream identifier is used to determine the RN stream, thus leaving the burden of managing multiple RN streams to the user. This can be onerous, especially if the application is iterative and RNs are consumed at multiple locations in each iteration. Use of a CPRNG may relieve a user from managing multiple streams for each thread or process. In some embodiments, the use of process/thread numbers may be used in addition to context information. The option of using process/thread number to determine RN contexts may be selected by a user at a compile-time or runtime. Use of a process/thread number in determining the RN context may reduce reproducibility of results.

In some embodiments, once a unique RN-context is determined, RN-context information may be embedded into a seed sequence to initialize an RN stream. The seed sequence may be, for example, a 976-bit sequence for a 64-bit MLFG with lag 17. In some cases, it may be sufficient to limit the RN-context size to, for example, two lag words (122 bits; only 61 bits of each 64-bit lag word are determined, and the remaining three bits are determined by a canonical form used to initialize the lag words). The RN-context may be concatenated with an additional deterministically generated distinct ID (one lag word or 61 bits) to further distinguish the initialization of RN streams. The remaining bits may be filled randomly using a good sequential RNG, such as a recursion with carry (RWC) generator using a user-supplied seed integer. These random bits may be common to the initialization of all RN streams.

In some embodiments, a CPRNG implements a scalable initialization of RN streams. In one embodiment, the CPRNG initializes RN streams using a return address, any user supplied identifier, seed information, and additional information that is generated by a CPRNG library. This additional information may be generated in different ways depending, for example, on the application code.

If the application is an MPI-based parallel program using single-program multiple data (SPMD) program model, then a special CPRNG module may be associated with process 0. The user may be neither aware of this nor expected to modify the application code. This CPRNG module may allocate several, for example, $2^{10}$, consecutive distinct 64-bit IDs in response to each initialization request. Each RN context may be augmented with one of the distinct IDs.

Some MPI processes dynamically spawn processes/threads that use RN streams. In some embodiments, a process supplies its unused IDs to its child processes to automatically ensure that RN streams are distinct. If a process runs out of its allocated distinct IDs, then the CPRNG module may allocates additional distinct IDs. (In such instances, an additional communication overhead may be incurred by CPRNG compared to the static methods used in the some packages.) Such an approach may require very low communication among the processes for RN stream initialization.

For parametric studies based on Monte Carlo simulations, the RN streams used for each instance of simulation can be ensured to be distinct by specifying the specific IDs (fore example, 64-bit IDs) to be used as additional input file that will be used by the CPRNG library. A script (such as a Python script) may partition ID space and generate the additional input files.

In SPRNG and other works, the initialization for an RN stream may be determined based on a user-supplied stream identifier and a seed integer. The seed integer may be, for example, a 32-bit or a 64-bit integer. To handle the issue of new RN streams for additional processes/threads spawned dynamically, the RN stream initialization space may be partitioned statically using a binary partitioning scheme to ensure initialization without any communication among processes. This can result in depletion of the initialization sequences quickly for applications with many levels of dynamic process/thread creation.

Although certain of the embodiments described above relate to simulations, systems and methods described herein may be used in a variety of applications. Examples of applications systems and methods described herein include (a) simulation-based solutions to large scientific and engineering problems, (b) parameterized Monte Carlo simulations of scientific, engineering, and finance problems, (c) distributed computing, and (d) protocols and keys used for information assurance and security.

Systems and methods described herein may be implemented in hardware including field programmable gate arrays (FPGAs) and application specific integrated circuit (ASIC) chips, or a suitable combination of hardware and software and which can be one or more software systems on a general purpose processor (CPU) or graphics processing unit (GPU).

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, a directional input device such as mouse, a voice recognition system to dictate text and issue commands for processing, and a touch screen that may serve as a keyboard or mouse. Computer systems may be operable to execute the computer programs to implement computer-implemented systems and methods. A computer system may allow access to users by way of any browser or operating system.

Embodiments of a subset or all (and portions or all) of CPRNG may be implemented and executed in a computer and the random number streams and random numbers so generated are accessed via computer network by at least one other computer executing the application requesting random numbers.

Embodiments of a subset of all (and portions or all) of code and data needed for CPRNG operation—initialize and maintain random number streams and provide random numbers from these streams—may be stored on a remote computer, which, in turn, provides the said instructions and data via a computer network to at least one other computer, which executes uses the received instructions and data to initialize and maintain random numbers and provide random numbers for applications requesting the same.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a computer system at a respective participant location may include a memory medium(s) on which one or more computer programs or software components according to one embodiment may be stored. For example, the memory medium may store one or more programs that are executable to perform the methods described herein. The memory medium may also store operating system software, as well as other software for operation of the computer system.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, as a library or standalone programs in a programming language such as C, C++, Java or in a scripting language such as Bash, Perl, Python, or AWK, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of dynamically providing random number streams to a process, comprising:
   determining, by a processing device, a plurality of program contexts within the process, wherein each program context comprises calls for one or more random numbers; and
   providing automatically, for each program context, a distinct random number stream, wherein the random number stream provided for one of the program contexts is based at least in part on the determined program context, and wherein the random number stream provided for one of the program contexts is distinct from the random number stream for at least one other of the program contexts.

2. The method of claim 1, wherein each of the program contexts is provided a random number stream that is distinct from the random number stream for any of the other program contexts in the process.

3. The method of claim 1, wherein providing the random number stream to the process for each of at least one of the two or more program contexts comprises providing a set of distinct random number streams in response to a call from one of the program contexts.

4. The method of claim 1, wherein providing the random number stream to the process for each of at least one of the two or more program contexts comprises initializing the states of the random number streams, wherein the states are used to generate distinct random number streams for at least two of the program contexts.

5. The method of claim 1, wherein one or more of the program contexts includes one or more random-number context and each of the random number contexts is determined based, at least in part, on a return address of a function call to obtain a random number.

6. The method of claim 1, wherein providing the random number stream to the process for each of at least one of the two or more program contexts comprises embedding context information into a seed sequence to initialize the random number stream.

7. The method of claim 1, wherein the process is one of two or more processes in a parallel process computation, wherein the random number stream provided for at least one of the program contexts is based in part on a process identifier for the process, wherein the random number stream is distinct from the random number stream provided for program contexts in at least one other process of the two or more processes in the parallel process computation.

8. The method of claim 1, wherein the random number stream provided for at least one of the program contexts is based in part on a user-supplied stream identifier for program context.

9. The method of claim 1, wherein providing the random number stream to the process for each of at least one of the two or more program contexts comprises receiving a stream identifier stored in, or generated from, a library module.

10. The method of claim 1, wherein the random number stream provided for at least one of the program contexts is based in part on an iteration number.

11. The method of claim 1, wherein the random number stream provided for at least one of the program contexts is based in part on a user-specified seed value.

12. The method of claim 1, wherein the process is a dynamically spawned process, wherein a random number stream allocated to it is based in part on unused initialization sequences from the random number streams originally allocated to the parent process from which the process was spawned.

13. A system, comprising:
    a processor;
    a memory coupled to the processor, wherein the memory comprises program instructions executable by the processor to implement:
    determining, using the processor, a plurality of program contexts within a process, wherein each program context comprises calls for one or more random numbers; and
    providing automatically, for each program context, a distinct random number stream, wherein the random number stream provided for one of the program contexts is based at least in part on the determined program context, and wherein the random number stream provided for one of the program contexts is distinct from the random number stream for at least one other of the program contexts.

14. The system of claim 13, further comprising:
    a network of systems in which one or more systems may store portions or all of code and data needed for CPRNG and compute or provide instructions or data needed to use CPRNG or the random numbers to at least one or more other systems by way of the computer network.

15. The system of claim 13, wherein each of the program contexts is provided a random number stream that is distinct from the random number stream for any of the other program contexts in the process.

16. A non-transitory, computer-readable storage medium comprising program instructions stored thereon, wherein the program instructions are configured to implement:
    determining one or more program contexts within a process, wherein at least one of the one or more program contexts comprises code that calls for one or more random numbers; and
    providing automatically, for each of at least one of the program contexts, a random number stream to the process, wherein the random number stream provided for at least one of the program contexts is based at least in part on the determined program context, and wherein the random number stream provided for at least one of the program contexts is distinct from the random number stream for at least one other of the program contexts.

17. The computer-readable storage medium of claim 16, wherein the program instructions further comprise:
CPRNG code and data in the storage medium of one computer accessed by way of a computer network by another computer to initialize and maintain random number streams and generate random numbers.

18. The computer-readable storage medium of claim 16, wherein each of the program contexts is provided a random number stream that is distinct from the random number stream for any of the other program contexts in the process.

* * * * *